(12) United States Patent
Chen et al.

(10) Patent No.: US 8,731,820 B2
(45) Date of Patent: May 20, 2014

(54) METHOD AND APPARATUS FOR KEYBOARD ARRANGEMENT FOR EFFICIENT DATA ENTRY FOR NAVIGATION SYSTEM

(75) Inventors: Kenny Chen, Torrance, CA (US); Mike Iao, Torrance, CA (US); Hikaru Wako, Torrance, CA (US); Andrew De Silva, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/408,702

(22) Filed: Feb. 29, 2012

(65) Prior Publication Data

US 2012/0232794 A1 Sep. 13, 2012

Related U.S. Application Data

(63) Continuation of application No. 11/582,797, filed on Oct. 18, 2006, now abandoned.

(51) Int. Cl.
*G06F 19/00* (2011.01)

(52) U.S. Cl.
USPC .......... 701/410; 701/426; 701/428; 701/432; 701/438; 701/447; 345/173; 345/619

(58) Field of Classification Search
USPC .......... 382/104; 701/428, 408, 410, 409, 420, 701/425, 426, 432, 447, 438; 345/173, 619, 345/145, 146
See application file for complete search history.

(56) References Cited

U.S. PATENT DOCUMENTS

2007/0127776 A1* 6/2007 Tokunaga ................. 382/104

FOREIGN PATENT DOCUMENTS

| JP | 2004-085362 | 3/2004 |
| JP | 2005-044220 | 2/2005 |
| JP | 2005-221245 | 8/2005 |

* cited by examiner

*Primary Examiner* — Ronnie Mancho
(74) *Attorney, Agent, or Firm* — Muramatsu & Associates

(57) ABSTRACT

A method and apparatus for entering an address for a navigation system allows a user to easily and quickly select a key indicating the next character of the address. At the start of operation, the navigation system shows a full alpha-numeric keyboard. Once the next candidate characters are narrowed down to a certain degree, the navigation system shows a simplified keyboard with a limited number of keys on the monitor screen and highlights the next candidate characters on the simplified keyboard. The navigation system displays both the simplified keyboard and a street name list on the same screen. Since the keys of the limited number are arranged within a small space such as in the three-by-three manner, the user can easily point a cursor or other pointing device to the desired key.

19 Claims, 13 Drawing Sheets

Fig. 3A
BOS
| BOSAKA |
|---|
| BOSCA |
| BOSCB |
| BOSCC |
| BOSCD |
| BOSCE |
| BOSCF |
| BOSCG |
| BOSCH |
| BOSCI |
| BOSCJ |
| BOSCK |
| BOSCL |
| BOSEK |
| BOSER |
| BOSET |
| BOSKA |
| BOSKER |
| BOSKW |

Fig. 3B
BOSA
| BOSAKA |
|---|

Fig. 3C
BOSAK
| BOSAKA |
|---|

Fig. 3D
BOSC
| BOSCA |
|---|
| BOSCB |
| BOSCC |
| BOSCD |
| BOSCE |
| BOSCF |
| BOSCG |
| BOSCH |
| BOSCI |
| BOSCJ |
| BOSCK |
| BOSCL |

Fig. 3E
BOSE
| BOSEK |
|---|
| BOSER |
| BOSET |

Fig. 3F
BOSK
| BOSKA |
|---|
| BOSKER |
| BOSKW |

Fig. 3G
BOSKE
| BOSKER |
|---|

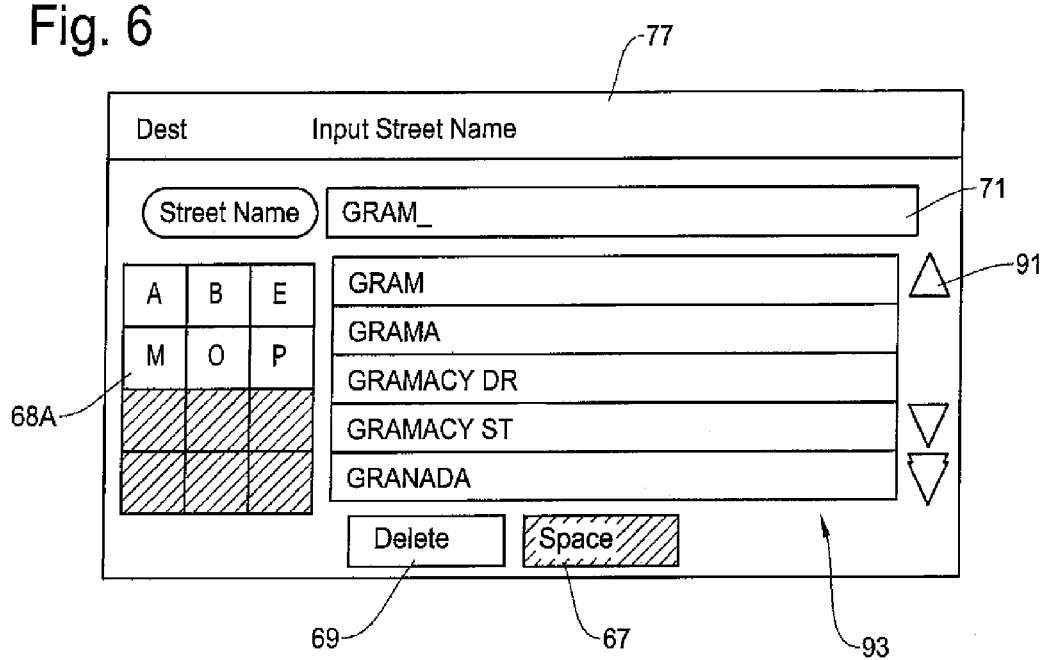

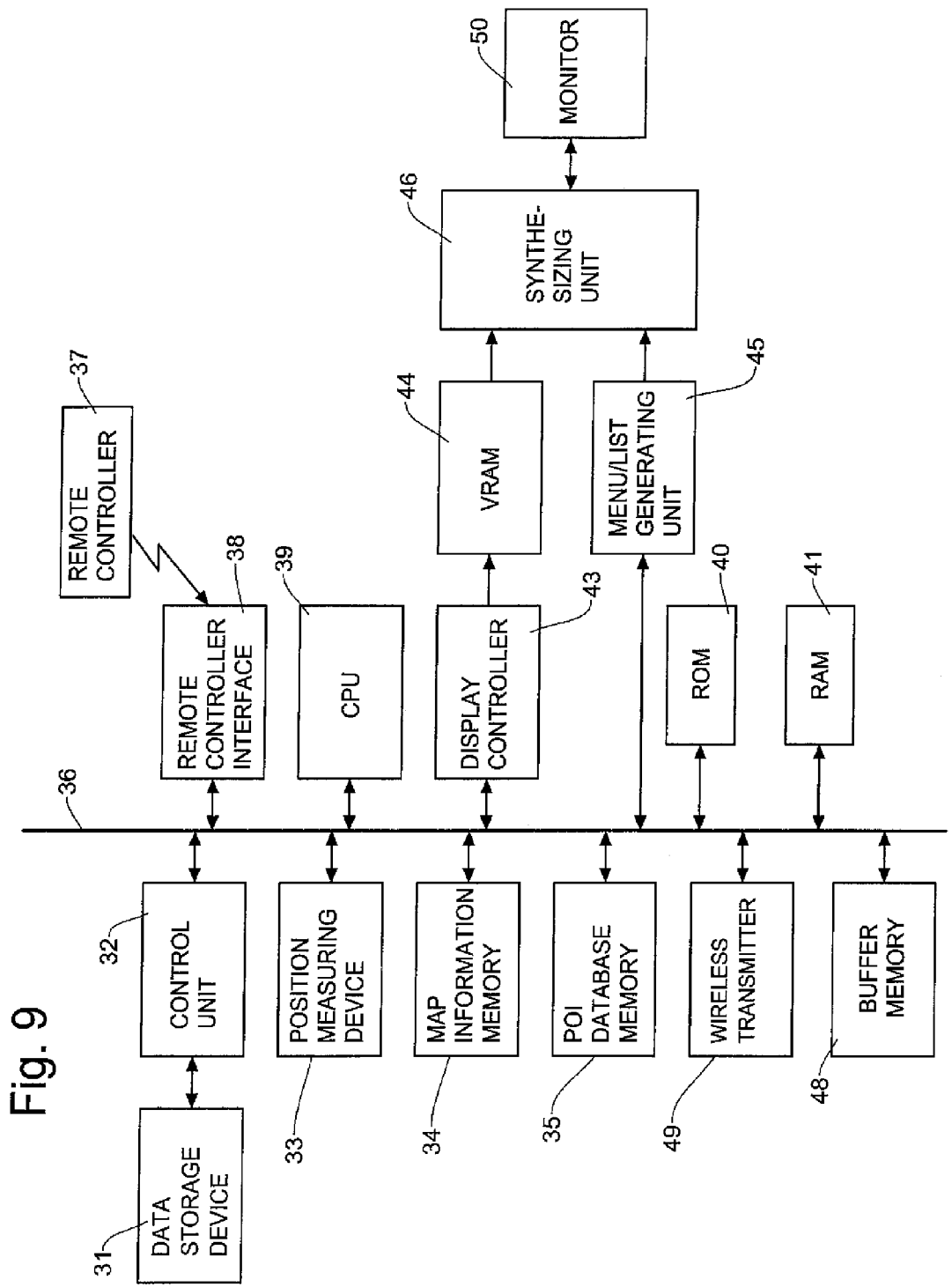

METHOD AND APPARATUS FOR KEYBOARD ARRANGEMENT FOR EFFICIENT DATA ENTRY FOR NAVIGATION SYSTEM

This is a continuation of U.S. patent application Ser. No. 11/582,797, filed Oct. 18, 2006 now abandoned, the entire contents of which are incorporated herein by reference.

FIELD OF THE INVENTION

This invention relates generally to a method and apparatus for arranging a keyboard for efficient data entry, and more particularly, to a method and apparatus for arranging a keyboard for efficient data entry for navigation system by showing a keyboard of reduced number of keys in a small area of a monitor screen.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium. Typically, the navigation system displays a map image on a monitor screen while superimposing thereon a mark representing the location of the user.

FIGS. 1A-1H show an example of overall procedure and screen display involved in the navigation system for a route guidance operation to a destination. FIG. 1A shows an example of locator map screen of the navigation system when the destination is not specified. Typically, the navigation system displays a street on which the vehicle (vehicle position VP) is running on a map image and a name of the street. Other information such as a north pointer NP, a map scale and a current time may also be illustrated on the display screen.

An example of process for specifying a destination in the navigation system by inputting a street name and street number is described. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying an address of the destination, "Intersection" for specifying the names of two streets which intersect with one another, and "Point of Interest (POI)" for selecting the programmed destination based on the name, category or telephone number, and other input methods known in the art.

When the "Address" method is selected in FIG. 1C, the navigation system displays a screen that allows the user to input a street name as shown in FIG. 1D which includes a keyboard for entering a street name. Next, the navigation system displays a screen for entering a street (house) number as shown in FIG. 1E which includes a numeric keyboard. Then, the navigation system shows a screen to confirm the destination in FIG. 1F.

On the confirmation screen, the user can press the "OK to proceed button" to calculate the route for route guidance. In FIG. 1G, the navigation system displays a progress scale during the calculation of the route to the destination. After determining the calculated route to the destination, the navigation system starts the route guidance operation as shown in FIG. 1H.

In entering a street name, the navigation system is able to assist the user to efficiently find the next character by disabling some keys that do not follow the string of characters that have been entered so far. FIG. 2A shows an example of a display that allows the user to enter a street name with use of an alpha-numeric keyboard. In the display shown in FIG. 2A, no character has been entered in the street name input field 71.

The display in FIG. 2B is similar to the display in FIG. 2A except that the user has entered characters "GRA" in the street name input field 71. Some keys on the keyboard 61 have been shaded, which indicates they are disabled. The navigation system determines available keys (characters) by searching candidate street names in a street name database. The disabled keys tell the user which characters are inappropriate for the street name.

When the navigation system narrows the candidate street names or the user presses the list button 63, the navigation system shows a list of relevant candidate street names as shown in FIG. 2C. The user can select a street name from the candidate list 92 by highlighting the street name. In this example, the candidate list 92 includes the street names "GRAM", "GRAMA", "GRAMACY DR", and "GRAMACY ST". Scroll arrows 91 on the display 77 allow the user to scroll the list to see more candidate street names if any.

Although the method of specifying an address by entering the street name and the street number described above is effective, disabled keys do not have meaningful function other than indicating that they are unavailable. A large space on the screen is wasted by the disabled keys. The enabled (highlighted) keys showing the next characters of the candidate street names may be far apart from one another where many disabled keys exist therebetween.

In such a situation, when operating a remote controller to input a street name, typically, a joystick on the remote controller has to be used. Unlike a touch screen input method where a user can select the highlighted (enabled) keys by touching the finger on the key, an input method using a pointing device such as a joystick is more difficult to accurately and quickly point a cursor on the highlighted keys. The user would have to focus on the entire layout of the keyboard to move the cursor to one of the highlighted keys. Thus, there is a need of a new key arrangement for a navigation system to accurately and quickly select the characters to input an address on the display screen.

SUMMARY OF THE INVENTION

It is, therefore, an object of the present invention to provide a method and apparatus for entering an address in a navigation system accurately and quickly even when using a pointing device by showing a simplified keyboard of reduced number of keys on a monitor screen.

One aspect of the present invention is a method for entering an address in a navigation system. The method includes the steps of displaying a screen including a street name input field for accepting input characters by a user and a full keyboard having all alphabetic keys, searching street names that match the input characters in the street name input field specified by the user and determining candidate characters of street names that come after the input characters, displaying a screen including a simplified keyboard having a reduced number of alphabetic keys when a number of the candidate characters is equal to or smaller than a predetermined number and a list of candidate street names, and selecting a final street name from the list of candidates street names.

The present invention further includes a step of repeating the step of displaying the screen including the full keyboard and the step of searching the street names that match the input characters until the number of the candidate characters becomes equal to or smaller than the predetermined number. The present invention further includes a step of repeating the steps of displaying the screen including the simplified keyboard and the step of searching the street names that match the input characters until the step of selecting the final street name every time when the user adds a new character in the street name input field.

Alternatively, the present invention further includes a step of displaying a screen including a list of candidate street names without showing the simplified keyboard when a number of candidate street names is equal to or smaller than a predetermined number.

The keys corresponding to the candidate characters are distinguished from the other keys on the full keyboard, and the keys corresponding to the candidate characters are distinguished from the other keys on the simplified keyboard. For example, the keys corresponding to the candidate characters are highlighted to be distinguished from the other keys on the full keyboard, and the keys corresponding to the candidate characters are highlighted to be distinguished from the other keys on the simplified keyboard.

The street name input field, the simplified keyboard with the reduced number of alphabetic keys, and the list of candidate street names are displayed on the same screen at the same time. In one example, the simplified keyboard has nine keys which are arranged in a three-by-three checker board manner. In another example, the keys on the simplified keyboard are arranged in a straight line.

Another aspect of the present invention is an apparatus for entering an address in a navigation system accurately and quickly even when using a pointing device by showing the simplified keyboard of reduced number of keys on the monitor screen. The apparatus of the present invention is configured by components corresponding to the various steps defined in the method noted above to implement the steps.

According to the present invention, the navigation system allows a user to easily and quickly select a key indicating the next character of the address. At the start of operation, the navigation system shows a full alphabetic keyboard. Once the next candidate characters are narrowed down to a certain degree, rather than the full alphabetic keyboard, the navigation system shows the simplified keyboard with a limited number of keys on the monitor screen and highlights the next candidate characters on the simplified keyboard.

Every time when a new character is input by the user, the navigation system checks an address database and determines the possible characters that can follow the user's input which are distinguished from other characters. The simplified keyboard is arranged to have the limited number of keys that are conveniently clustered in a small area such as in a 3-by-3 checker board manner. The navigation system displays both the keyboard and the street name list on the same screen. Since a limited number of keys are arranged within a small space such as in the 3-by-3 manner, the user can easily point a cursor or other pointing device to the desired key.

BRIEF DESCRIPTION OF THE DRAWINGS

FIGS. 3A-3G are schematic diagrams showing tables listing street names in the database for explaining the meaning of the term "candidate characters" within the context of the present invention.

FIG. 4A shows a full keyboard to enter a street name, FIG. 4B shows a condition where some keys are shaded and disabled due to the input that limits possible keys, FIG. 4C shows a simplified keyboard and candidate list under the present invention, FIG. 4D shows a condition where "OYSTER" has been input, FIG. 4E shows a condition where a space has been input after "OYSTER", FIG. 4F shows a condition where the street name "OYSTER POINT" is highlighted, and FIG. 4G shows a screen where only a street name list is displayed.

FIG. 6 is a schematic diagram showing another example of key arrangement on the monitor screen where the simplified keyboard is comprised of twelve keys.

FIG. 9 is a block diagram showing an example of configuration of a vehicle navigation system implementing the present invention.

DETAILED DESCRIPTION OF THE PREFERRED EMBODIMENT

Figure 1A:
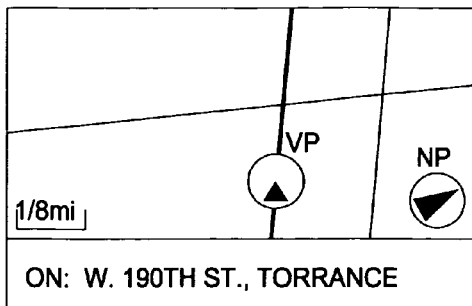
FIGS. 1A-1H are schematic diagrams showing an example of operational process and screen display involved in the navigation system for entering an address of the destination for route guidance.
Figure 1B:
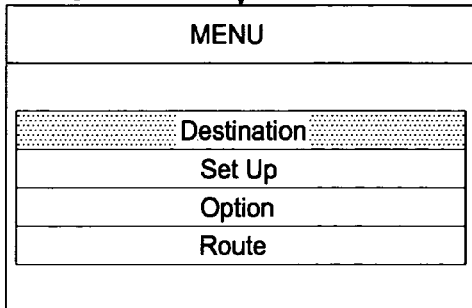
Figure 1C:
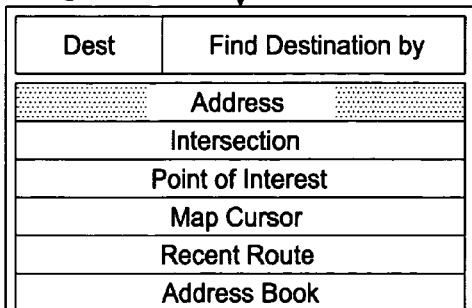
Figure 1D:
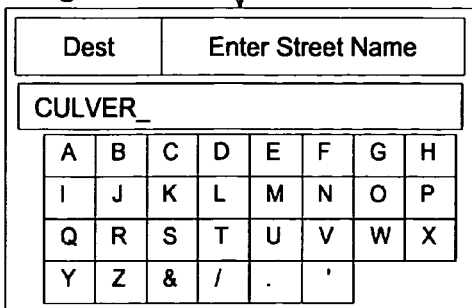
Figure 1E:
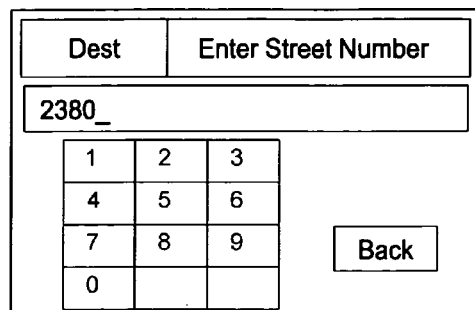
Figure 1F:
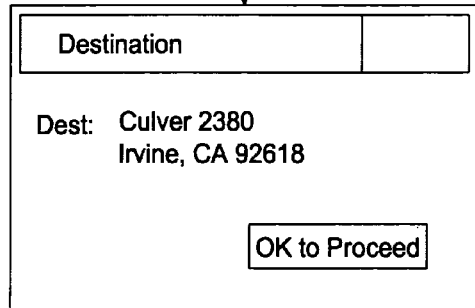
Figure 1G:
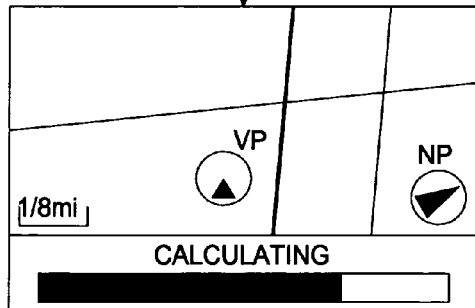
Figure 1H:
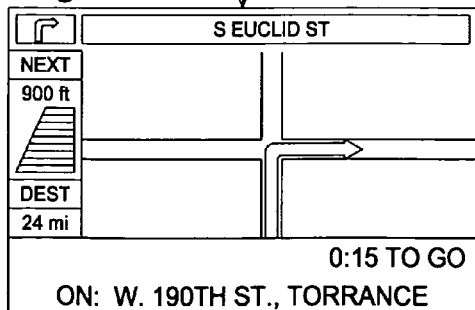

The present invention will be described in detail with reference to the accompanying drawings. The method and apparatus of the present invention is designed to allow a user to easily and quickly select a key indicating the next character of the address. In the first step of entering an address, the method and apparatus starts with a full alphabetic keyboard or a full alpha-numeric keyboard. However, once the next candidate characters are narrowed down to a certain degree, rather than the full keyboard, a key arrangement with a limited number of keys will be displayed on the monitor screen to highlight the next candidate characters.

Every time when a new character is input by the user, the method and apparatus of the present invention checks an address database (map data) and determines the possible characters that can follow the user's input. If the number of possible (candidate) characters is equal to or smaller than a predetermined number, the method and apparatus displays a simplified keyboard having the predetermined (limited) number of keys from which the next character is to be selected. Rather than a full (standard) keyboard, the simplified keyboard is arranged to have the limited number of keys that are conveniently clustered in a small area at a particular location on the monitor screen such as in a 3-by-3 checker board manner.

Within the context of the present invention, the term "candidate characters" means any available characters that can be selected based on a particular input for any possible next character inputs (not only immediately next characters but also any characters that follow). FIGS. 3A-3G show tables listing entries in the database for explaining the meaning of the term "candidate characters" within the context of the present invention. This example shows the case where the user has entered characters "BOS" and the database includes street names that match "BOS" as shown in FIG. 3A. In this situation, the next possible characters in the present invention are shown in FIGS. 3B-3G.

In this example, the number of possible characters immediately after the input "BOS" is four (A, C, E, K). Thus, if the predetermined number of keys on the simplified keyboard is nine, the navigation system would change the full keyboard to the simplified keyboard. However, the present invention checks all candidate characters that are possible for any next character inputs. For example, when the next character "C" is input after the situation of FIG. 3A so that the entry "BOSC" is given to the navigation system, the number of candidate characters is twelve (A, B, C, D, E, F, G, H, I, J, K, L) as shown in FIG. 3D. Thus, in the example of. FIGS. 3A-3G, the screen of the navigation system remains the full keyboard if the predetermined number is less than twelve such as nine.

As noted above, if the number of candidate characters is equal to or smaller than the predetermined number, the monitor screen will be changed to the simplified keyboard. Since the number of keys is reduced and the monitor screen can afford an extra space for the keyboard due to the reduced number of keys, both the keyboard and a list of candidate entries can be displayed on the same screen at an early stage of operation. Further, since the reduced number of keys are arranged within a small space such as in a 3-by-3 manner, the user can easily point a cursor or other pointing device to the desired key. Thus, it is possible to easily enter an address in the navigation system with use of a joystick, cursor keys, arrow keys, etc.

The present invention is described mainly for the case where the method and apparatus is implemented to a vehicle navigation system and where a street name is to be entered. However, it should be noted that the input method and apparatus of the present invention may be implemented to other systems, such as a portable navigation system or a computer search system. Moreover, the present invention can be used to input not only the street name, but also other components of an address such as a city name, street (house) number, etc., or a name of a point of interest (POI).

Figure 4A:
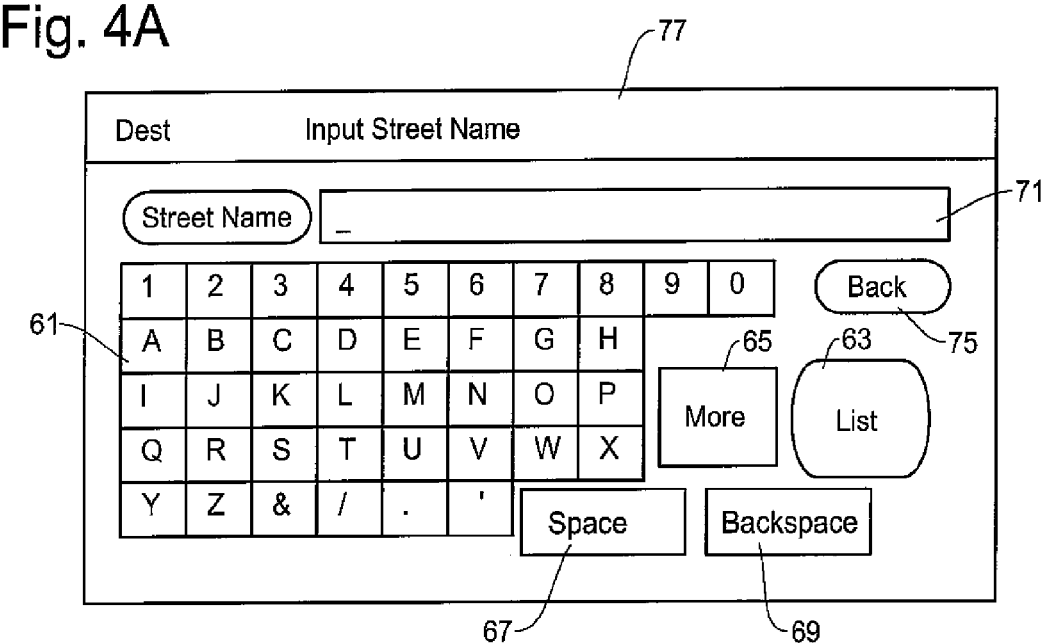
FIGS. 4A-4G are schematic diagrams showing the steps of inputting a street name and associated display examples under the present invention where

The basic steps of inputting a street name under the present invention is described with reference to display examples on the monitor screen shown in FIGS. 4A to 4G. FIG. 4A is similar to the display shown in FIGS. 2A and 2B where the user inputs the street name through a standard keyboard which is a full alphabetic keyboard or a full alpha-numeric keyboard. FIG. 4A shows a situation where no character is specified by the user. In this example, the display screen 77 includes a back key 75, a list key 63, a more key 65, an alpha-numeric keyboard 61, a space key 67, a backspace key 69, and a street name input field 71.

The keyboard 61 is used to enter a street name and other inputs to the street name input field 71. The space key 67 is used to input a space and the back space key 69 is used to go back to the previous character in the input field 71. The "more" key 65 is to display additional keys for inputting special characters. The back key 75 is used to go back to the previous screen. The list key 63 is used to list relevant entries based on the characters specified so far.

Figure 4B:
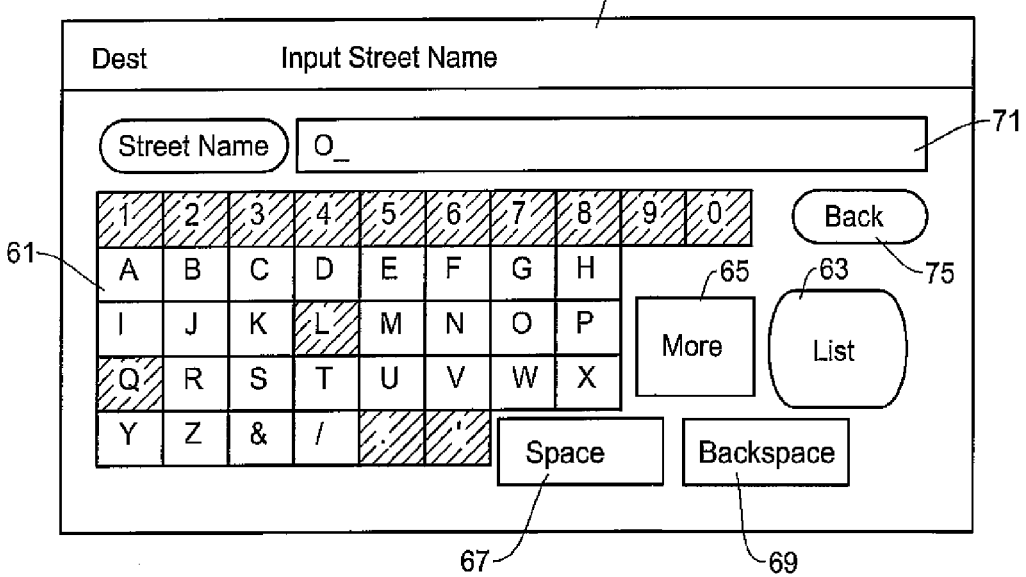

Although the keyboard 61 is comprised of alphabet and numeric keys in this display, the keyboard may only be comprised of alphabet keys while allowing numeric keys to be displayed by pressing a key to toggle between the alphabet keys and numeric keys. FIG. 4B shows the condition where the user has entered an alphabet "O" in the street name input field 71. As the user enters a character, the navigation system will check the address database to determine what entries are available and disable some keys that cannot follow the string of characters entered so far. As shown in FIG. 4B, several characters are shaded and disabled, in other words, the candidate characters are highlighted and enabled to be easily selected by the user.

Figure 4C:
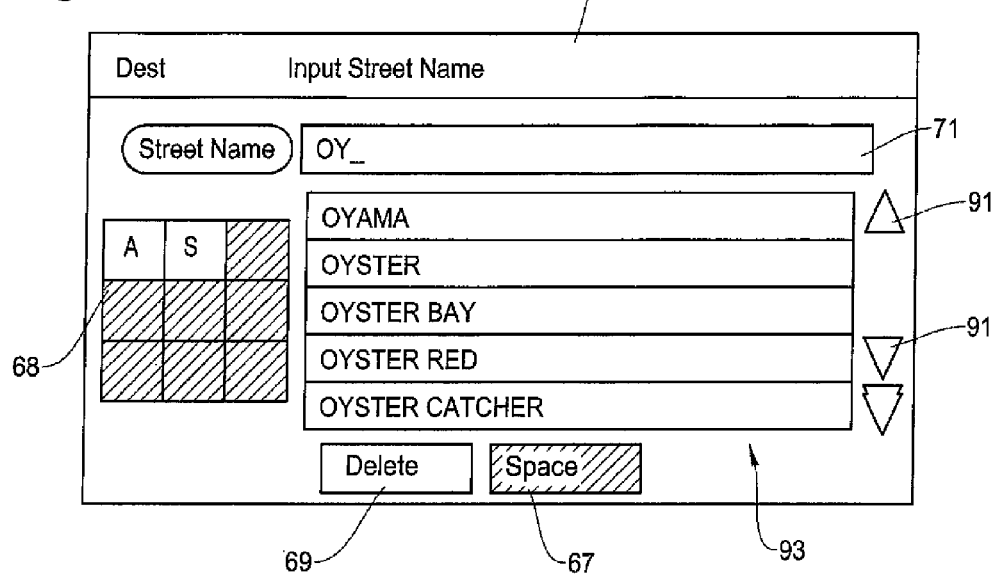

FIG. 4C shows the display example where the user has entered a character "Y" in addition to the previously entered character "O" such that the entry in the street name field 71 reads "OY". This display is different from the previous displays in that the number of the keys has been reduced, and the keys are clustered in a small area. Further, the display of FIG. 4C is different from the previous displays in that candidate street name entries that match "OY" are also listed on the same screen 77.

In this example, a simplified keyboard 68 rather than the full keyboard 61 is displayed on the screen 77. The simplified keyboard 68, in this example, has nine keys which are arranged in a 3-by-3 fashion. Since the keyboard 68 is small because it has only nine keys, it is located at one side of the screen 77 so that the list 93 of the candidate street names can also be displayed on the same screen. The street name entry list 93 shows the candidate street names from which the user may select an intended street name. The user can scroll the list 93 by operating the scroll keys 91 to see further candidate street names if any.

The two keys on the keyboard 68 representing "A" and "S" are highlighted and enabled while the others are shaded and disabled. The navigation system may have nine enabled buttons depending on the availability of the candidate entries although the display shown in FIG. 4C shows only two enabled buttons. In other words, the keyboard 68 having nine keys will be displayed when the number of candidate characters that follow the characters in the street name input filed 71 is equal to or less than nine.

Figure 2A:
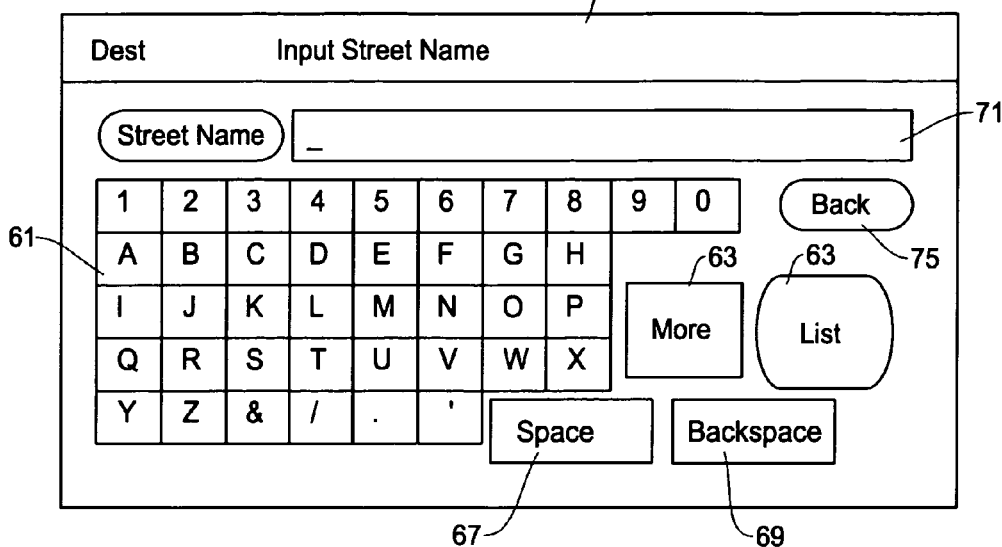
FIGS. 2A-2C show display examples on the screen that allow the user to enter a street name through a conventional input method where no character is input in FIG. 2A so that all keys are highlighted, the user has entered "GRA" in the street name field in FIG. 2B so that some keys are disabled, and in FIG. 2C, the screen shows a list of candidate street names when the number of candidate is less than a predetermined number or a list key is pressed.
Figure 2B:
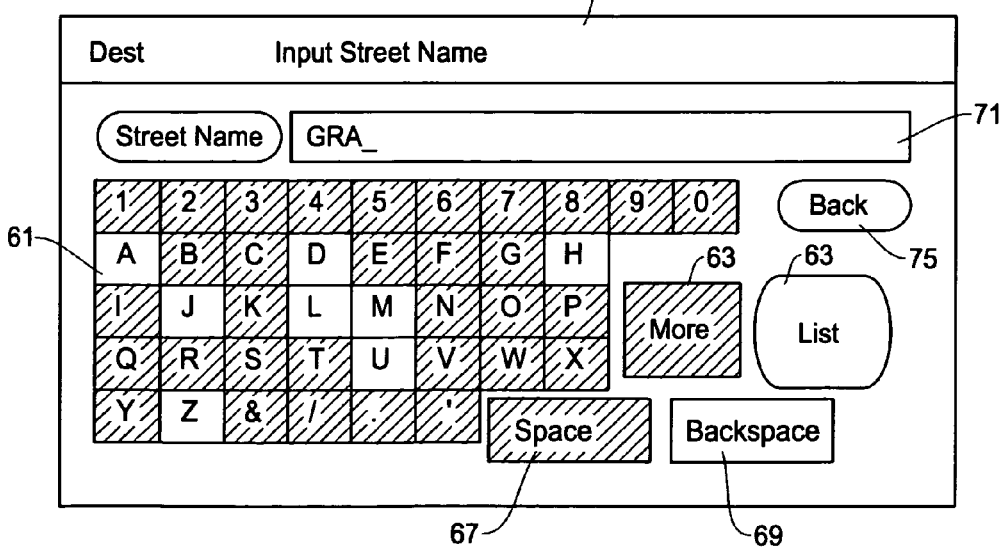
Figure 2C:
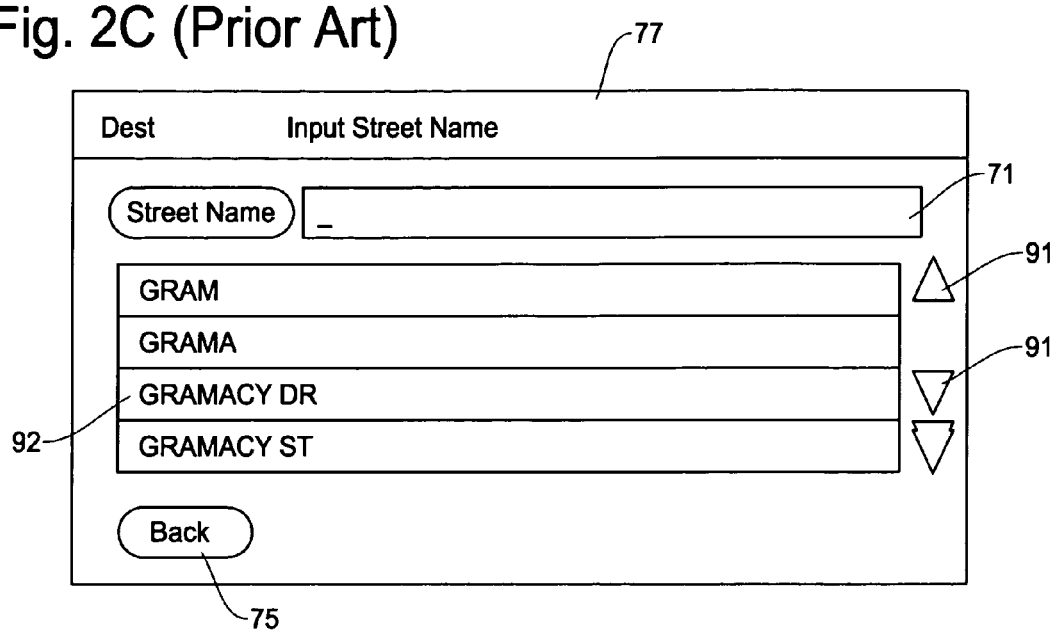

The inventors of the present invention have discovered that the navigation system as described in FIGS. 2A-2C requires about 5.4 times of input operation in average to reach the list screen shown in FIG. 2C. The input method under the present method, on the other hand, can reach the list screen shown in FIG. 4C in about 3.7 times of input operation for 60 percent of the street names in the database. Thus, the navigation system under the present invention allows efficient operation of the street name input.

Figure 4D:
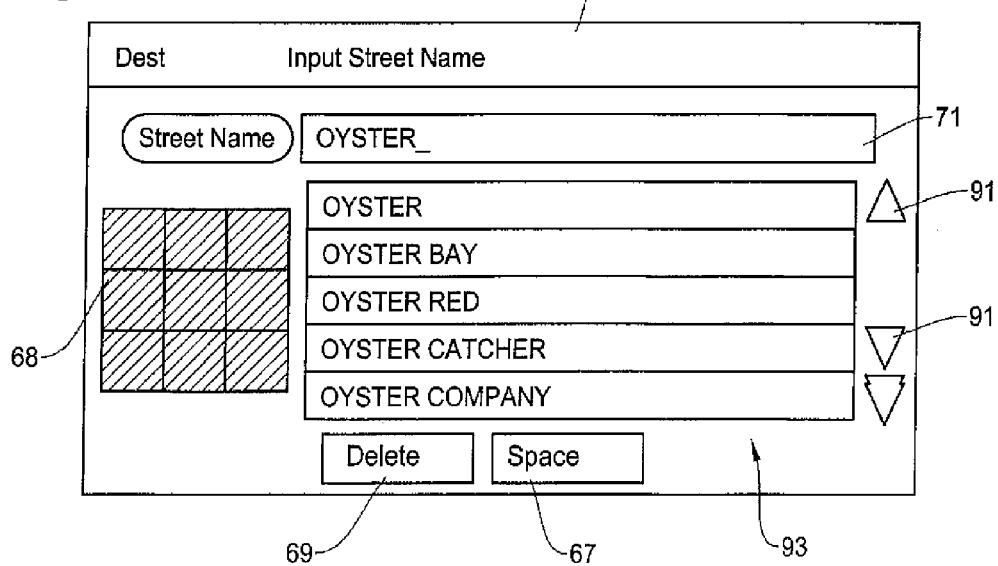

As the user enters more characters in the street name input field 71, the screen shown in FIG. 4D is displayed. In this example, "OYSTER" has been entered and all the keys in the keyboard 68 have been shaded and disabled. This is because, in this particular example, there is no street name that has a further character at the end of "OYSTER" without a space. Thus, the space key 67 is enabled (highlighted) so that the user can press the space key 67, or may select the desired street name from the list 93.

Figure 4E:
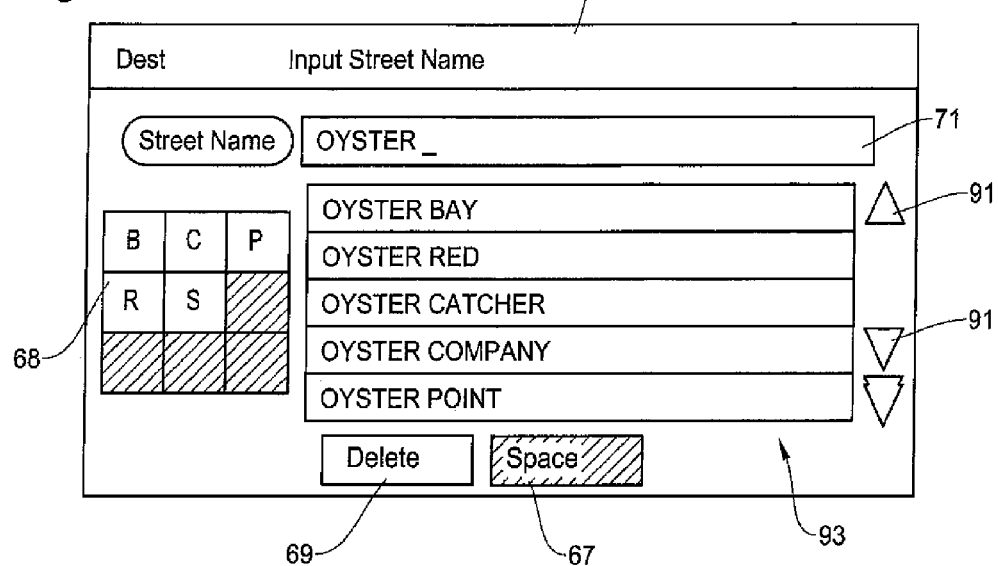

The display example of FIG. 4E shows the situation resultant of the process that the user has pressed the space key 67 in FIG. 4D. Thus, the street name list 93 show the candidate street names each having a space after the characters "OYS- TER". The simplified keyboard 68 highlights (enables) the candidate characters that come after the space for the corresponding street names. The user can scroll the list 93 by pressing scroll button 91.

Figure 4F:
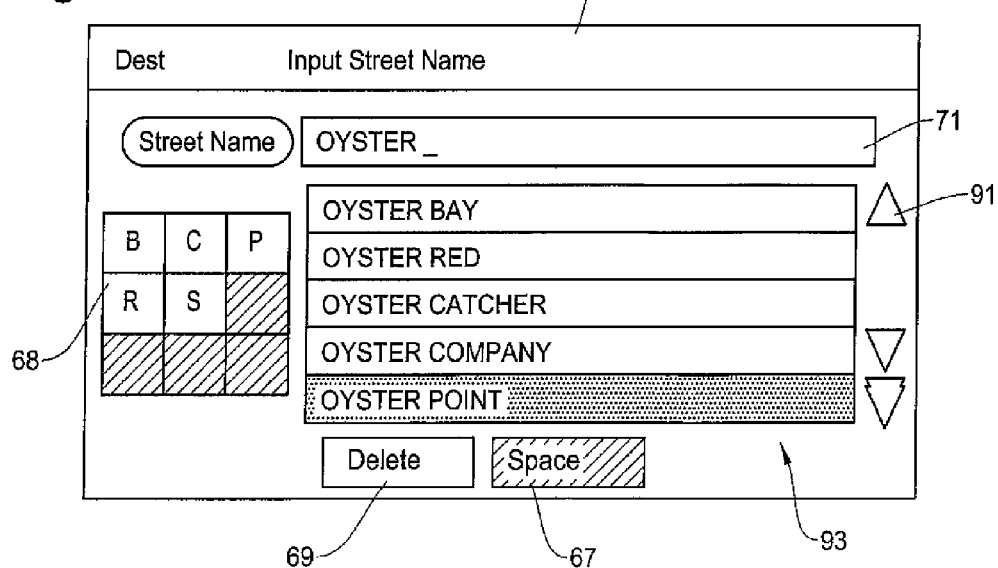

The display example of FIG. 4F shows the condition where the user has selected the street name "OYSTER POINT" as indicated by the dot hatch on the street name list. The key arrangement of the present invention described in the foregoing promotes efficient selection of a desired key especially when a cursor is used to point a desired key. For example, in the case where a remote controller has arrow keys (or joystick) for eight directions, the user is able to move the cursor to any one of the keys by one movement if an initial default position of the cursor is preferably set at the center of the keyboard 68, although any initial default position is possible.

Figure 4G:
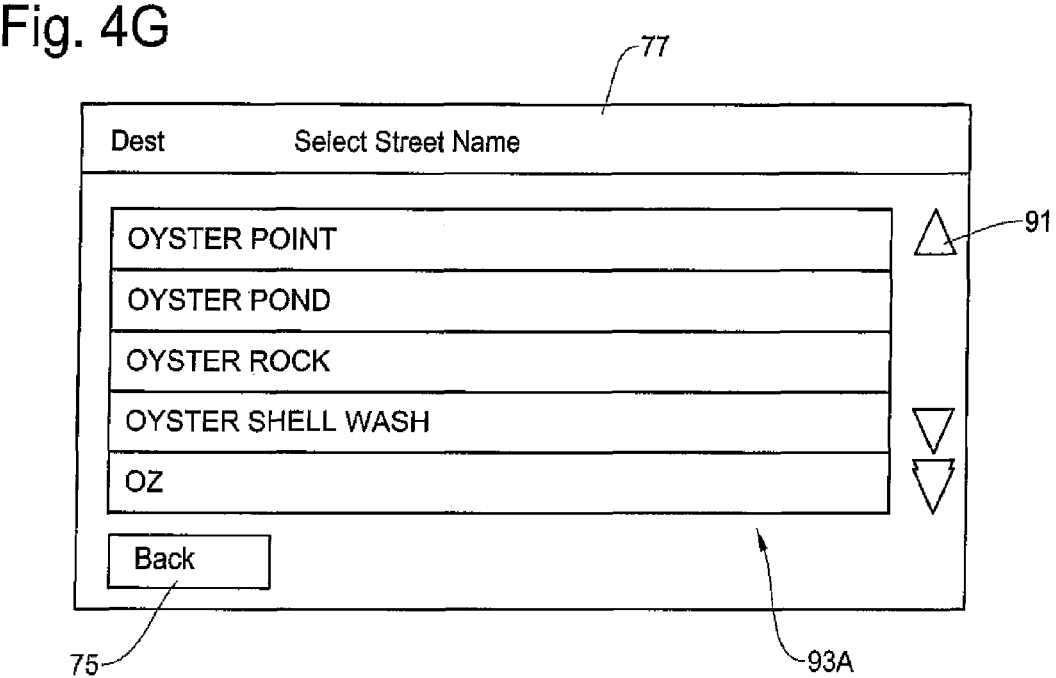

The display example of FIG. 4G shows another situation where the number of candidate street name is reduced to a predetermined number or less. In this example, the navigation system may automatically display the list screen on the screen 77 without displaying the keyboard at all. For example, when the predetermined number is five, as shown in FIG. 4G, all of the candidates street names can be displayed on the same screen without need of scrolling. In such a case, it is easier for the user to directly select the desired street name from the list 93 rather than further selecting the next character. Thus, the simplified keyboard 68 is not displayed on the screen 77 although it is also feasible to simply retain the keyboard 68 even when the number of candidate street names is less than the predetermined number.

Figure 5A:
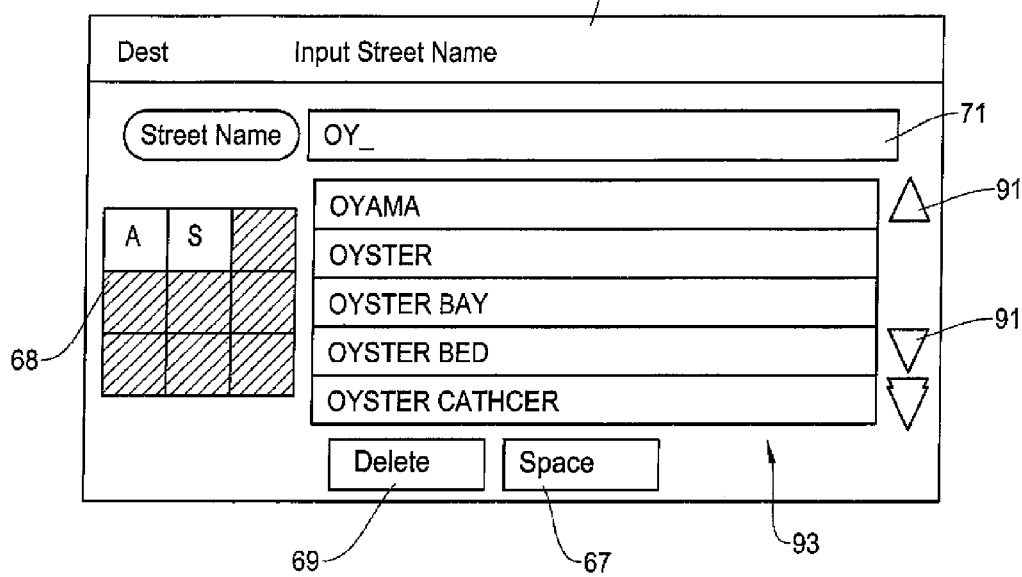
FIGS. 5A and 5B are schematic diagrams showing the steps of scrolling the list of candidate street names and associated display examples in the present invention.
Figure 5B:
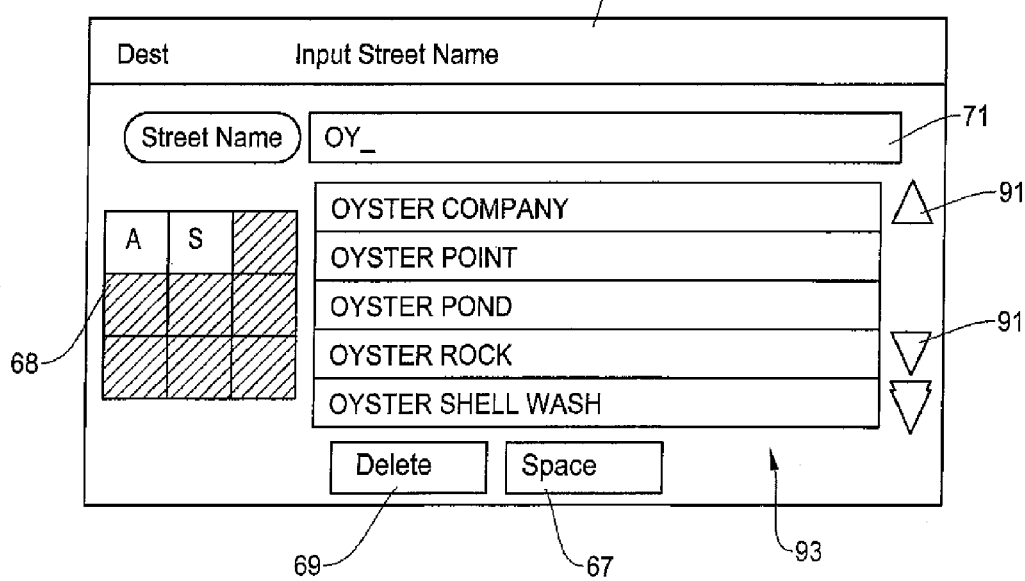

FIGS. 5A and 5B show display examples for describing the operation of scrolling the street name list 93 by the scroll keys 91 under the present invention so that the user is able see more candidate entries. FIG. 5A shows the situation where the characters "OY" have been entered in the street name input field 71. The display lists "OYAMA", "OYSTER", "OYSTER BAY", "OYSTER BED", and "OYSTER CATCHER". The user can scroll the street name list 93 by pressing the scroll keys in up/down directions to see further entries. FIG. 5B shows the display where the user has scroll down the street name list 93. The street name list 93 now shows "OYSTER COMPANY", "OYSTER POINT", "OYSTER POND", "OYSTER ROCK", and "OYSTER SHELL WASH".

FIG. 6 is a display example having an alternative key arrangement that is functionally equivalent to the display shown in FIGS. 4C-4F. In this example, a simplified keyboard 68A having 12 keys is incorporated in the screen 77 which also shows the street name list 93. Thus, this example is preferably used when the number of possible characters that come after the input made by the user is twelve or less. The keys on the keyboard 68A in this example are arranged in a 3-by-4 checker board manner.

Other arrangement of the keyboard is also feasible. For example, it is also possible to arrange the keyboard such that it is two rows and five columns of keys with a total of 10 keys, etc. The user can select a desired street name from the street name list 93 or further selects the key that is highlighted on the keyboard 68A. As noted above, the scroll keys 91 may be used to scroll the street name list 93 to see the further candidate street names if any.

Figure 7A:
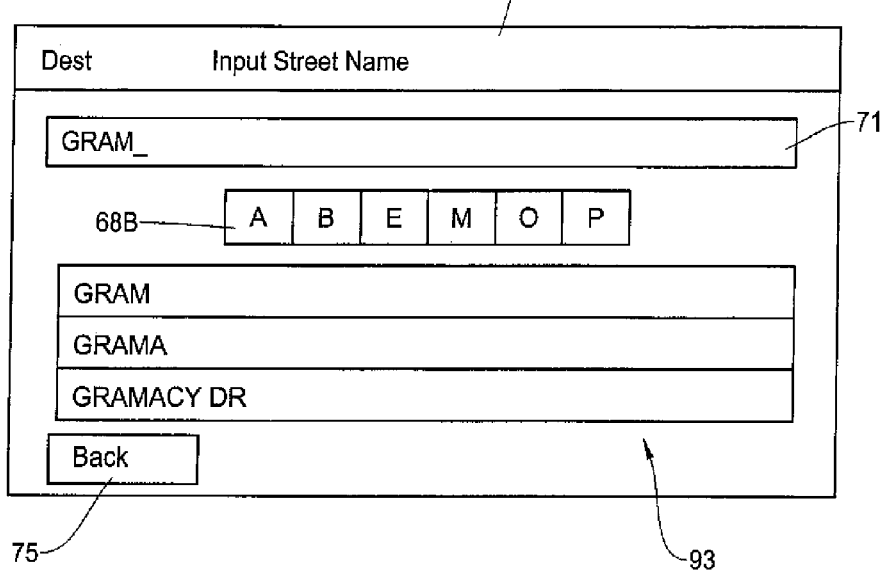
FIGS. 7A and 7B are schematic diagrams showing further examples of key arrangement on the monitor screen where the simplified keyboard having six keys is arranged in a straight line in FIG. 7A and the simplified keyboard having ten keys is arranged in a straight line in FIG. 7B.
Figure 7B:
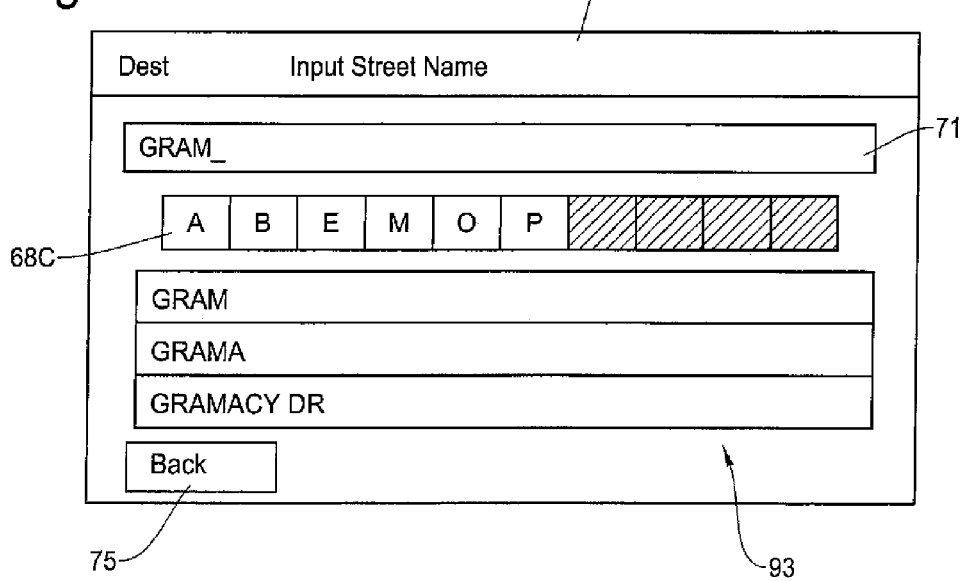

FIGS. 7A and 7B show further alternative key arrangements in accordance with the present invention. In FIG. 7A, the street name list 93 is located at the lower part of the display screen 77 and a simplified keyboard 68B is displayed above the street name list 93. In this example, the keyboard 68B has six keys so that the keyboard 68B will show up when the number of candidate characters of street names are equal to or less than six. The user can either select a street name from the street name list 93 or select one of the keys from the keyboard 68B to further narrow down the street name.

Similarly, in FIG. 7B, the street name list 93 is located at the lower part of the display screen 77 and a simplified keyboard 68C is displayed above the street name list 93. In this example, the keyboard 68C has ten keys so that the keyboard 68C will show up when the number of candidate characters of street names are equal to or less than ten. The user can either select a street name from the street name list 93 or select one of the keys from the keyboard 68C to further narrow down the street name. Although the keys in the keyboards 68B and 68C are arranged in one row in the examples of FIGS. 7A and 7B, such keys can be arranged in two or more rows or a checker board manner.

Figure 8:
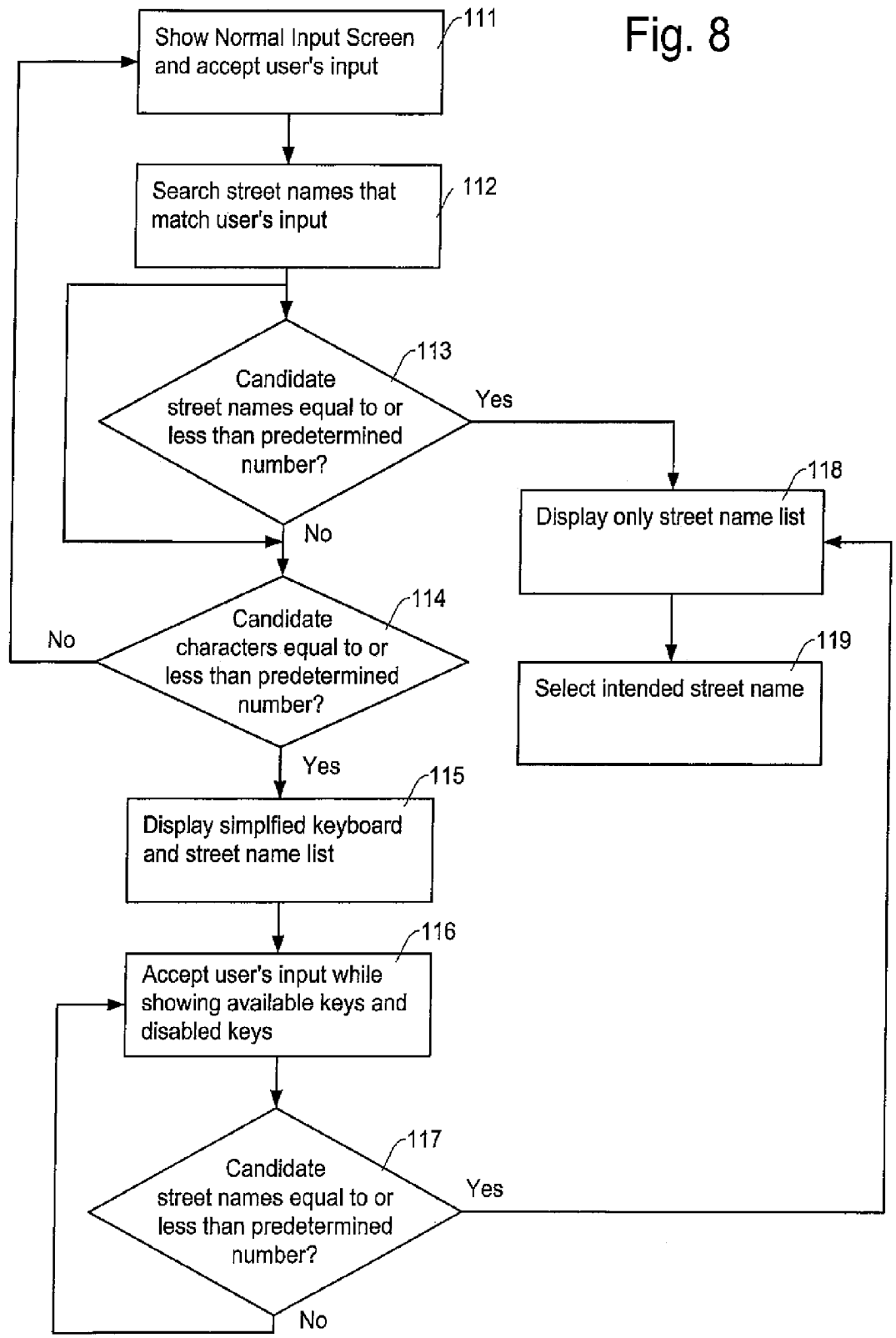
FIG. 8 is a flow chart showing an example of basic operational process for inputting an address in the navigation system of the present invention.

FIG. 8 is a flow chart showing an example of basic operation of the input method under the present invention. In the step 111, the navigation system displays the normal input screen such as shown in FIG. 4A having a full keyboard. The user may enter a character in the street name input field 71 by, for example, pointing a cursor on the keyboard by manipulating a joystick on a remote controller or arrow keys. In the step 112, as the user enters a character, the navigation system searches candidate street names that have the characters specified in the street name input field 71 by the user so far.

In the step 113, the navigation system further checks whether the total number of candidate street names is equal to or less than a predetermined number. In the case described with reference to FIG. 4G, such a predetermined number is five. Thus, if the total number of candidate street names is equal to or less than five, the navigation system displays only the street name list 93 in the step 118. The user selects the intended street name from the street name list 93 in the step 119.

As shown in the flow chart, the step 113 can be omitted, and the process can move directly from the step 112 to the step 114. In the step 114, the navigation system checks the number of the candidate characters as to whether the number is equal to or less than the predetermined number, i.e., the limited number of keys in the simplified keyboard. In the example described with reference to FIGS. 4C-4F, the predetermined number is nine. Thus, the navigation system determines whether the number of candidate characters (all possible characters) of street names that come after the characters specified in the street name input field 71 is equal to or less than nine. If the answer is no, the navigation system repeats the steps 111-114 to show the normal input screen while disabling keys that will not follow the character string input so far in the street name input field 71 such as shown in FIG. 4B.

In the step 115, the navigation system displays the simplified keyboard 68 such as shown in FIGS. 4C-4F where the overall number of keys is reduced to nine and the keys are clustered in a small area. In addition to the simplified keyboard 68, in the step 115, the navigation system also shows the street name list 93 on the same screen 77. This is because the number of possible street names is limited and there is an enough space on the screen due to the small size of the simplified key board 68.

In the step 116, based on search result of the candidate street names, the navigation system enables certain keys on the simplified keyboard 68 that can follow the user's input while disabling the others. Every time the new character is added to the street name input field, the navigation system checks the candidate characters, i.e, candidate street names. In the step 117, the navigation system determines whether the number of candidate street names is equal to or less than the predetermined number. If the answer is affirmative, the process moves to the step 118, and if the answer is negative, the process returns to the step 116.

When the candidate street names are sufficiently narrowed down, the user selects the intended street name from the street name list 93 in the step 119.

FIG. 9 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The data storage medium 31 may store a database for determining the possible characters that follow the user's input so that the reduced keypad under the present invention can be implemented. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, and etc.

The block diagram of FIG. 9 further includes a map information memory 34 for storing the map information which is read from the data storage device 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In the case where the remote controller 37 has the eight arrow keys for moving to eight directions and the keyboard shown in FIGS. 4C-4E where the reduced keyboard has nine keys, the user is able to select any one of the button with the operation of at most one arrow key when the initial position of the highlighted button is at the center. This is due to the fact that all candidate buttons surround the center button. Even if the navigation system has four arrows for moving to four directions, the user has the benefit of knowing which buttons will be selected since the buttons are not scattered around the whole display area. The data storage device 31 stores the map data including a street name (address) database that allows the search based on a base name and a full name of the street name.

In FIG. 9, the navigation system further includes a bus 36 for interfacing the above units in the system, a processor (CPU) 39 for controlling an overall operation of the navigation system including the operation of entering the address of the present invention described above, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transmitter 49 for wireless communication to retrieve data from a remote server, a buffer memory 48 for temporally storing data for ease of data processing, and a monitor (display) 50.

As has been described above, according to the present invention, the navigation system allows a user to easily and quickly select a key indicating the next character of the address. At the start of operation, the navigation system shows a full alpha-numeric keyboard. Once the next candidate characters are narrowed down to a certain degree, rather than the full alpha-numeric keyboard, the navigation system shows the simplified keyboard with a limited number of keys on the monitor screen and highlights the next candidate characters on the simplified keyboard.

Every time when a new character is input by the user, the navigation system checks an address database and determines the possible characters that can follow the user's input which are distinguished from other characters. The simplified keyboard is arranged to have the limited number of keys that are conveniently clustered in a small area such as in a 3-by-3 checker board manner. The navigation system displays both the keyboard and the street name list on the same screen. Since the limited number of keys are arranged within a small space such as in the 3-by-3 manner, the user can easily point a cursor or other pointing device to the desired key.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for entering an address for a navigation system, comprising the following steps of:
displaying a street name input field for accepting input characters entered by a user and a full keyboard having all alphabetic keys in a screen on a monitor;
searching, by using a processor and a database, first street names that match input characters in the street name input field entered by the user through the full keyboard;
determining candidate characters of the first street names that come after the input characters;
determining whether a number of possible alphabets in the candidate characters immediately after the input characters is equal to or smaller than a first predetermined number;
displaying a list of candidate street names comprising the candidate characters after the input characters and a simplified keyboard having a reduced number of alphabetic keys compared to the full keyboard in the screen on the monitor, if it is determined that the number of the possible alphabets immediately after the input characters is equal to or smaller than the first predetermined number; and
searching, by using the processor and the database, second street names that match input characters in the street name input field entered by the user through the simplified keyboard and determining candidate characters of the second street names comprising possible alphabets that come after the input characters;
wherein the reduced number of alphabetic keys of the simplified keyboard are associated with alphabets among the possible alphabets immediately after the input characters as next character inputs.

2. The method of claim 1, further comprising a step of:
repeating the step of displaying the list of candidate street names and the simplified keyboard and the step of searching the second street names that match the input characters when the user adds a new character in the street name input field.

3. The method of claim 1, further comprising a step of:
displaying the list of candidate street names and hiding the simplified keyboard, if a number of the candidate street names is equal to or smaller than a second predetermined number.

4. The method of claim 1, wherein the alphabetic keys corresponding to the possible alphabets are displayed in a different manner from other keys on the simplified keyboard.

5. The method of claim 1, wherein the step of displaying the list of candidate street names and the simplified keyboard instead of the full keyboard in the screen on the monitor further comprises a step of displaying the street name input field in the screen.

6. An apparatus for entering an address for a navigation system, comprising:
a display controller configured to display a street name input field for accepting input characters entered by a user and a full keyboard having all alphabetic keys on a monitor;
a processor configured to search first street names that match input characters in the street name input field entered by the user through the full keyboard, and to determine candidate characters of the first street names that come after the input characters;
wherein the processor is further configured to determine whether a number of possible alphabets in the candidate characters immediately after the input characters is equal to or smaller than a first predetermined number,
wherein the display controller is configured to display a list of candidate street names comprising the candidate characters after the input characters and a simplified keyboard having a reduced number of alphabetic keys compared to the full keyboard in the screen on the monitor, if it is determined that the number of the possible alphabets immediately after the input characters is equal to or smaller than the first predetermined number;
wherein the processor is further configured to search second street names that match input characters in the street name input field entered by the user through the simplified keyboard and to determine candidate characters of the second street names comprising possible alphabets that come after the input characters; and
wherein the reduced number of alphabetic keys of the simplified keyboard are associated with alphabets among the possible alphabets immediately after the input characters as next character inputs.

7. The apparatus of claim 6, wherein the processor is further configured to repeat displaying the simplified keyboard in the screen and to searching the second street names that match the input characters when the user adds a new character in the street name input field.

8. The apparatus of claim 6, wherein the display controller is configured to further configured to display a list of candidate street names and to hide the simplified keyboard, if a number of candidate street names is equal to or smaller than a second predetermined number.

9. The apparatus of claim 6, wherein the display controller is configured to display the alphabetic keys corresponding to the possible alphabets in a manner different from other keys on the simplified keyboard.

10. The apparatus of claim 6, wherein the display controller is further configured to display the street name input field in the screen while displaying the list of candidate street names and the simplified keyboard instead of the full keyboard in the screen on the monitor.

11. The apparatus of claim 6, wherein the simplified keyboard comprises $n^2$ keys arranged in an n-by-n checkerboard manner, where n is a natural number.

12. The apparatus of claim 6, wherein the simplified keyboard comprises the reduced number of keys arranged in a row or a column.

13. A non-transitory computer readable medium having stored thereon a navigation system program that instructs a processor to at least:
display a street name input field for accepting input characters entered by a user and a full keyboard having all alphabetic keys in a screen on a monitor;
search first street names that match input characters in the street name input field entered by the user through the full keyboard;
determine candidate characters of the first street names that come after the input characters;
determine whether a number of possible alphabets in the candidate characters immediately after the input characters is equal to or smaller than a first predetermined number;
display a list of candidate street names comprising the candidate characters after the input characters and a simplified keyboard having a reduced number of alphabetic keys compared to the full keyboard in the screen on the monitor, if it is determined that the number of the possible alphabets immediately after the input characters is equal to or smaller than the first predetermined number; and
search second street names that match input characters in the street name input field entered by the user through the simplified keyboard and determine candidate characters of the second street names comprising possible alphabets that come after the input characters;
wherein the reduced number of alphabetic keys of the simplified keyboard are associated with alphabets among the possible alphabets immediately after the input characters as next character inputs.

14. The non-transitory computer readable medium of claim 13, wherein the navigation system program further instructs the processor to repeat displaying the list of candidate street names and the simplified keyboard and searching the second street names that match the input characters when the user adds a new character in the street name input field.

15. The non-transitory computer readable medium of claim 13, wherein the navigation system program further instructs the processor to display the list of candidate street names and hide the simplified keyboard, if a number of the candidate street names is equal to or smaller than a second predetermined number.

16. The non-transitory computer readable medium of claim 13, wherein the navigation system program further instructs the processor to display the alphabetic keys corresponding to the possible alphabets in a different manner from other keys on the simplified keyboard.

17. The non-transitory computer readable medium of claim 13, wherein the navigation system program further instructs the processor to display the street name input field in the screen simultaneously while displaying the list of candidate street names and the simplified keyboard instead of the full keyboard in the screen on the monitor.

18. The non-transitory computer readable medium of claim 13, wherein the navigation system program further instructs the processor to display the simplified keyboard comprising $n^2$ keys arranged in an n-by-n checkerboard manner, where n is a natural number.

19. The non-transitory computer readable medium of claim 13, wherein the navigation system program further instructs the processor to display the simplified keyboard comprising the reduced number of keys arranged in a row or a column.

* * * * *